(12) United States Patent
Sasamoto et al.

(10) Patent No.: US 6,295,507 B1
(45) Date of Patent: Sep. 25, 2001

(54) CALIBRATION METHOD FOR ACCELERATION SENSOR IN STORAGE DEVICE AND STORAGE DEVICE

(75) Inventors: Tatsuro Sasamoto; Koichi Aikawa; Susumu Yoshida; Akihide Jinzenji, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/389,730

(22) Filed: Sep. 3, 1999

(30) Foreign Application Priority Data

Mar. 10, 1999 (JP) .................................................. 11-062655

(51) Int. Cl.$^7$ .............................. G11B 5/596; G06F 19/00
(52) U.S. Cl. .................. 702/104; 360/77.03; 360/77.04; 360/78.09; 360/78.13
(58) Field of Search ..................................... 702/104, 105, 702/141; 360/77.03, 77.04, 77.07, 77.08, 77.11, 78.09, 78.13, 78.14, 78.07

(56) References Cited

U.S. PATENT DOCUMENTS

| | | | |
|---|---|---|---|
| 4,660,106 | * 4/1987 | Hamson et al. | 360/77.08 |
| 4,814,909 | * 3/1989 | Brown et al. | 360/77.04 |
| 4,872,074 | * 10/1989 | Brown et al. | 360/77.07 |
| 4,920,434 | * 4/1990 | Brown et al. | 360/77.03 |
| 4,982,296 | * 1/1991 | Brown et al. | 360/77.03 |
| 5,299,075 | 3/1994 | Hanks . | |
| 5,426,545 | 6/1995 | Sidman et al. . | |
| 5,663,847 | 9/1997 | Abramovitch . | |
| 5,946,159 | * 8/1999 | Chliwnyj et al. | 360/77.12 |

FOREIGN PATENT DOCUMENTS 945024   2/1997   (JP) .

* cited by examiner

Primary Examiner—Marc S. Hoff
Assistant Examiner—Bryan Bui
(74) Attorney, Agent, or Firm—Greer, Burns & Crain, Ltd.

(57) ABSTRACT

Disclosed is a calibration method for an acceleration sensor in a storage device for calibrating and a storage device, an enclosure for calibrating the acceleration sensor for compensating a vibration of an enclosure in a state of its being mounted in a storage drive. The calibration method and mode comprises a step of exciting a actuator of the drive by flowing a drive current having a predetermined current value, a step of calculating the acceleration of the enclosure of the drive from the predetermined current value and a mechanical transfer function of the storage device, a step of detecting a measured value of the acceleration sensor, and a step of calculating a sensitivity of the acceleration sensor from the calculated acceleration and from the detected measured value. The acceleration sensor is calibrated in the state of its being mounted in the disk drive, and hence the sensitivity can be precisely calibrated.

19 Claims, 11 Drawing Sheets

FIG. 1

CDNT

Prior Art

CALIBRATION METHOD FOR ACCELERATION SENSOR IN STORAGE DEVICE AND STORAGE DEVICE

BACKGROUND OF THE INVENTION

1. Field of the Invention

The present invention relates to a calibration method for an acceleration sensor in a storage device and a storage device, for correcting a position of an actuator by detecting an acceleration of an enclosure in the storage device for reading or reading/writing data by a head from and to a storage medium.

2. Description of the Related Art

A storage disk device such as a magnetic disk device etc is widely utilized as a storage device for a computer etc. a high density record and a speed-up are requested of this type of storage disk device.

Figure 10:
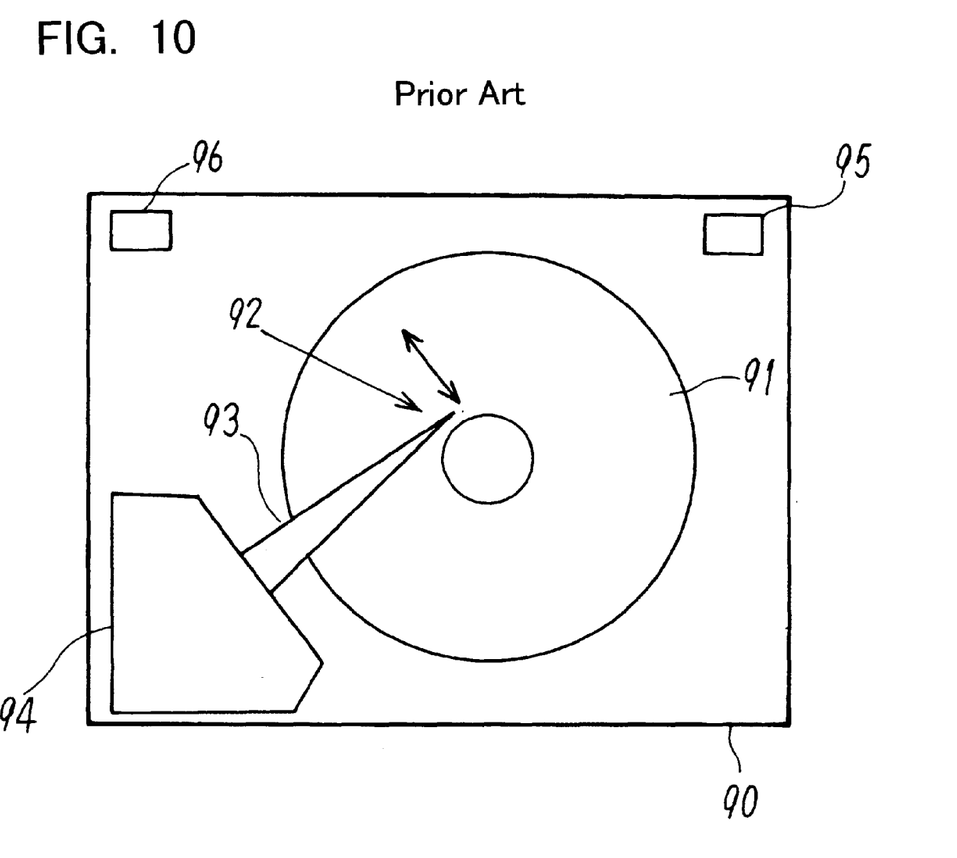
FIG. 10 is a diagram illustrating a construction of a magnetic disk device in the prior art.
Figure 11:
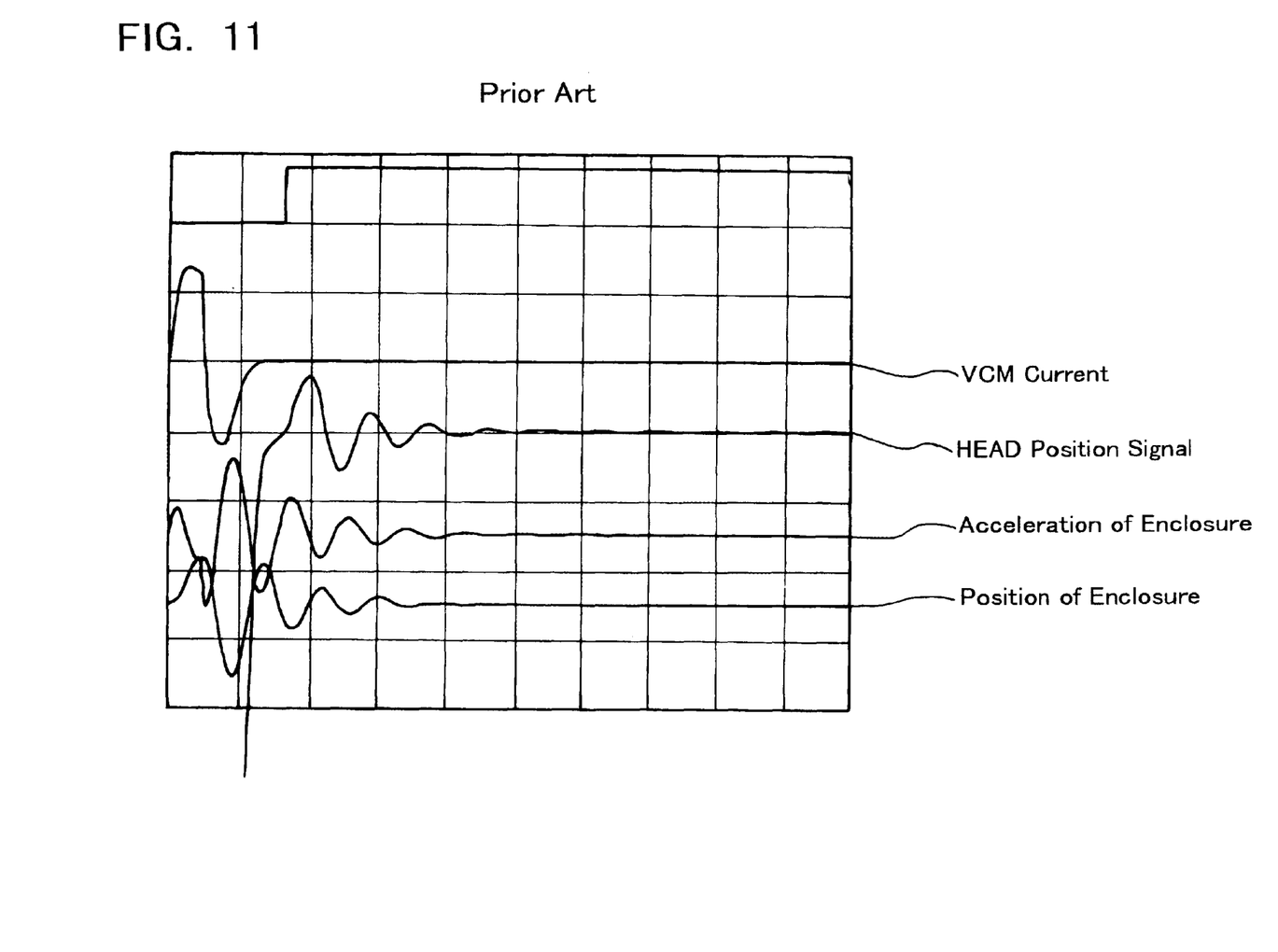
FIG. 11 is an explanatory diagram showing a residual vibration in the prior art.

FIG. 10 is a diagram showing a construction of a magnetic disk device in the prior art. FIG. 11 is an explanatory diagram showing residual vibrations of an enclosure.

As shown in FIG. 10, the magnetic disk device includes a magnetic disk 91 and a magnetic head 92. The magnetic head 92 reads and writes data from and to the magnetic disk 91. An actuator 93 supports the magnetic head 92. A VCM (voice coil motor) 94 drives the actuator 93. An enclosure 90 holds those components inside.

In the thus constructed magnetic disk device, the actuator 93 mounted with the magnetic head 92 seeks the head 92 from a certain track to another target track. This is called a seek operation. A high-speed respondency is obtained reducing this seek time.

The acceleration and deceleration of the actuator 93 are intensified for reduce the seek time. At this time, a force acts upon the whole enclosure 90 of the disk device due to reaction of the actuator 93. The enclosure 90 is normally fixed, and therefore it does not mean that the enclosure 90 is vibrated by the reaction as it is. A mechanical transfer function thereof, however, has a point of resonance at a given frequency. Therefore, as shown in FIG. 11, when the enclosure 90 is excited by the seek reaction, a vibration of the enclosure 90 remains after the seek operation.

This vibration is applied to a head position signal as a relative deviation between the head 92 and the disk medium 91, and hence appears as a residual vibration in the position signal after the seek. Consequently, the seek time elongates. One of the basic countermeasures is to enhance a capability of restraining an error signal by improving a servo control characteristic. When a track pitch on the disk is narrowed, however, it can not cope with this simply by a servo gain enhancement. Further, the vibration of the enclosure is on the order of several hundreds Hz which can not be essentially compressed by a normal servo system of the magnetic disk.

In a prior system, as shown in FIG. 10, acceleration sensors 95, 96 for detecting an acceleration of the enclosure 90 are provided for directly measuring the acceleration of the enclosure 90. Then, there is proposed a feed forward system for correcting the servo control signal by the measured signal. This type of system is disclosed in, e.g., Japanese Patent Application Laid-Open Publication No.9-45024, U.S. Pat. No. 5,299,075, U.S. Pat. No. 5,426,545 and U.S. Pat. No. 5,663,847.

There arise, however, the following problems inherent in the prior art.

(1) It is required that a sensitivity of the acceleration sensor be obtained in order to use the acceleration sensor and utilize this sensor for the position control. There is, however, the sensitivity of the acceleration sensor is different in each sensor. For example, in piezoelectric sensors, there is ±20% difference in the sensitivity. Accordingly, a problem is that a preferable output can not be obtained even by setting a fixed sensitivity.

(2) There is a method of selecting parts which have been calibrated beforehand. However, a problem is that the cost increases. Further, the sensitivity on a state of being loaded into the device might differ from the detected sensitivity on a state of the parts. Therefore, there arises such a problem that a calibrated value on the state of the parts can not be used as it is.

SUMMARY OF THE INVENTION

It is a primary object of the present invention to provide a calibration method for an acceleration sensor in a storage device and a storage device, which is capable of calibrating the acceleration sensor in a state of being loaded into a device.

It is another object of the present invention to provide a calibration method for an acceleration sensor in a storage disk device and a storage device, which is capable of precisely calibrating the acceleration sensor.

To accomplish the above objects, according to a first aspect of the present invention, there is provided a calibration method for an acceleration sensor in a storage device comprising a storage medium, a head for reading data from the storage medium, an actuator for positioning the head with respect to the storage medium, an enclosure for accommodating said storage medium, said head and said actuator, an acceleration sensor for detecting an acceleration of the enclosure, and a control circuit for calculating a first command value from an output of said acceleration sensor and a sensitivity of said acceleration sensor and then calculating a drive current value of said actuator from said first command value and a second command value for servo control. The calibration method comprises a step of exciting said actuator by flowing a drive current having a predetermined value, a step of calculating the acceleration of the enclosure from the predetermined current value and a mechanical transfer function of the storage device, a step of detecting a measured value of the acceleration sensor, and a step of calculating the sensitivity of the acceleration sensor from the calculated acceleration and from the detected measured value.

And a storage device comprises a storage medium, a head for reading data from said storage medium, an actuator for positioning said head with respect to said storage medium, an enclosure for accommodating said storage medium, said head and said actuator, an acceleration sensor for detecting an acceleration of said enclosure, and a control circuit having a seek process mode for calculating a first command value from an output of said acceleration sensor and a sensitivity of said acceleration sensor and then calculating a drive current value of said actuator from said first command value and a second command value for servo control, and a calibration process mode for calculating the sensitivity of said acceleration sensor from the output of said acceleration sensor when exciting said actuator and a drive current value of said actuator when exciting said actuator.

The present invention involves the use of a fiducial frame construction of which a mechanical transfer function is known. The fiducial frame construction is configured that an enclosure encasing the respective components of the storage device is fixed to a frame of a personal computer etc by a method of fixing the actual enclosure. This fiducial frame construction has the mechanical transfer function based on the enclosure and the fixing method.

The acceleration sensor is mounted on the enclosure fixed to the frame having the above known transfer function. Then, the actuator performs a seek operation, and an output of the acceleration sensor is measured. A value of the acceleration with this seek operation can be, with the mechanical transfer function being known, calculated from an electric current flowed and the mechanical transfer function. A sensitivity of the acceleration sensor can be obtained by comparing the thus calculated acceleration value of the enclosure with the measured value.

According to a second aspect of the invention, the exciting step comprises a step of flowing a seek current for accelerating and decelerating the actuator.

According to a third aspect of the invention, the exciting step includes a step of flowing a drive current for seeking the actuator in a forward direction, and a step of flowing a drive current for seeking the actuator in a reverse direction.

According to a fourth aspect of the invention, the exciting step includes a step of flowing a drive current for seeking the actuator at a first distance, and a step of flowing a drive current for seeking the actuator at a second distance different from the first distance.

According to a fifth aspect of the invention, the calculating step comprises a step of Fourier-transforming the acceleration obtained by the calculation, a step of Fourier-transforming the measured acceleration, and a step of calculating the sensitivity of the acceleration sensor by comparing specified frequency components of the two Fourier-transformed accelerations.

According to a sixth aspect of the invention, the exciting step comprises a step of flowing a drive current to the actuator so that the actuator follows up a specified position.

According to a seventh aspect of the invention, the exciting step includes a step of flowing a drive current having a first measurement frequency to the actuator, and a step of flowing to the actuator a drive current having a second measurement frequency different from the first measurement frequency.

According to an eighth aspect of the invention, the exciting step includes a step of flowing to the actuator a drive current having a first amplitude value, and a step of flowing to the actuator a drive current having a second amplitude value different from the first amplitude value.

According to a ninth aspect of the invention, a calibration method for an acceleration sensor in a storage device comprises a step of starting up a spindle motor, a step of calculating the acceleration of the enclosure from the start-up current value and from a mechanical transfer function of the storage device, a step of detecting a measured value of the acceleration sensor, and a step of calculating the sensitivity of the acceleration sensor from the calculated acceleration and from the detected measured value.

According to the ninth aspect of the invention, the enclosure is vibrated by starting up the spindle motor. Then, the acceleration value of the enclosure is calculated from the start-up current value and the mechanical transfer function. The sensitivity (a gain) of the acceleration sensor is obtained from the calculated acceleration value and the measured value of the acceleration sensor.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DESCRIPTION OF THE PREFERRED EMBODIMENT

Figure 1:
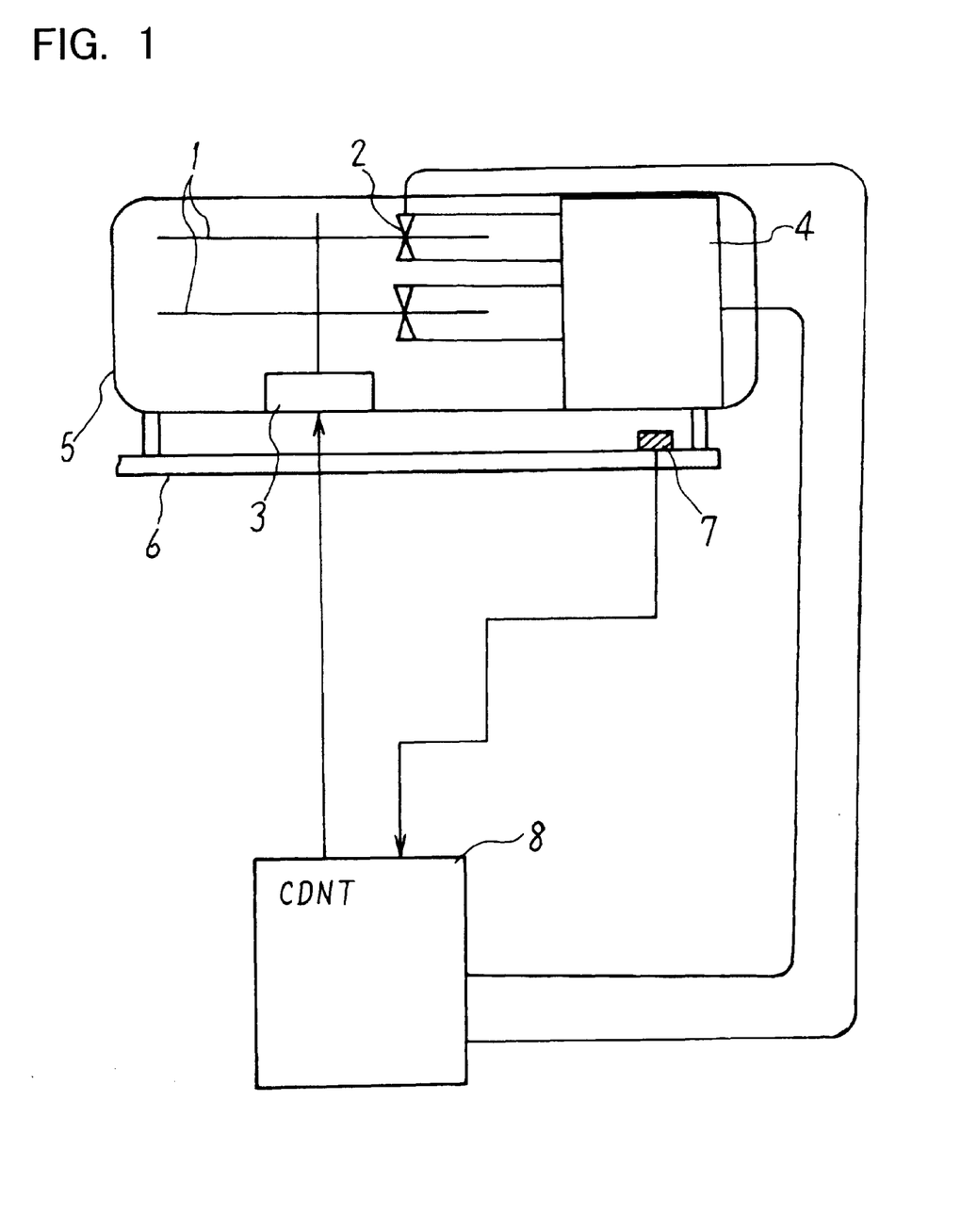
FIG. 1 is a diagram showing a construction of a magnetic disk device in one embodiment of the present invention.
Figure 2:
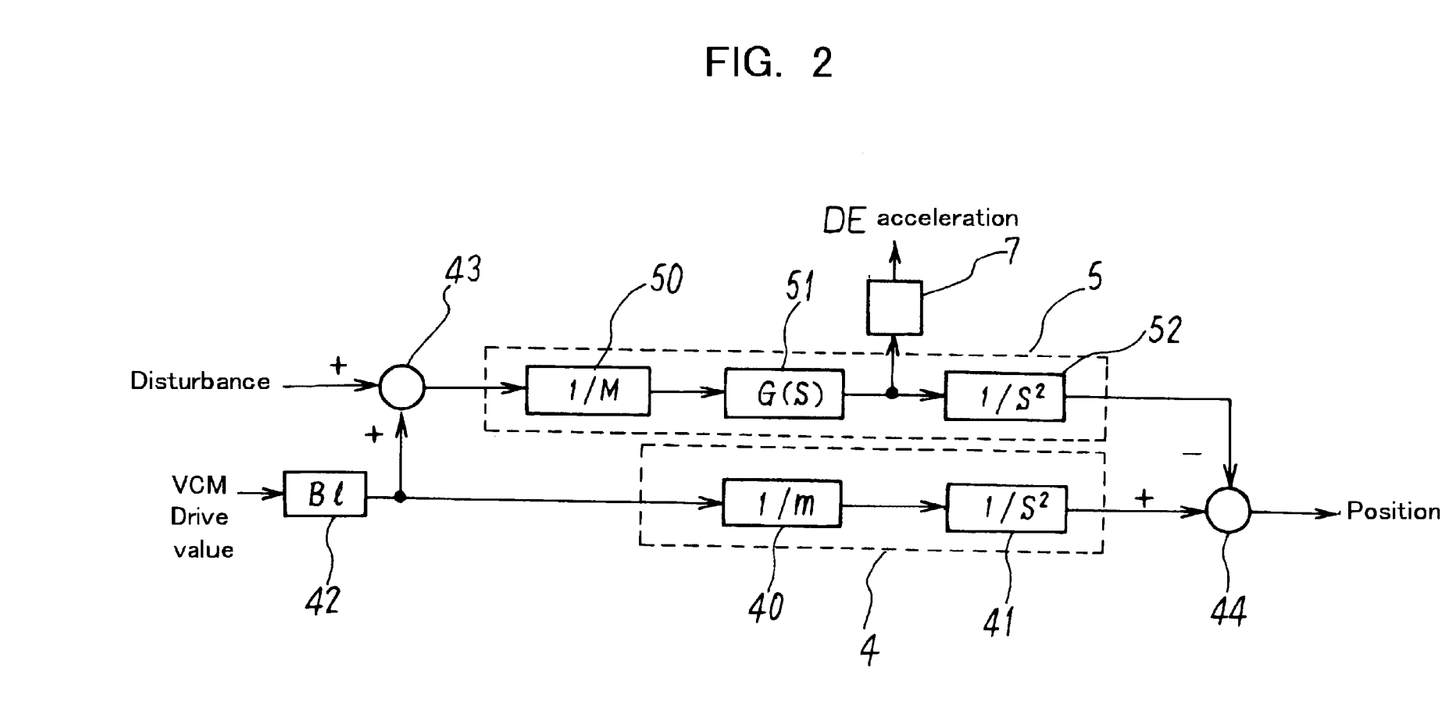
FIG. 2 is a diagram showing a vibration model of an enclosure in FIG. 1.
Figure 3:
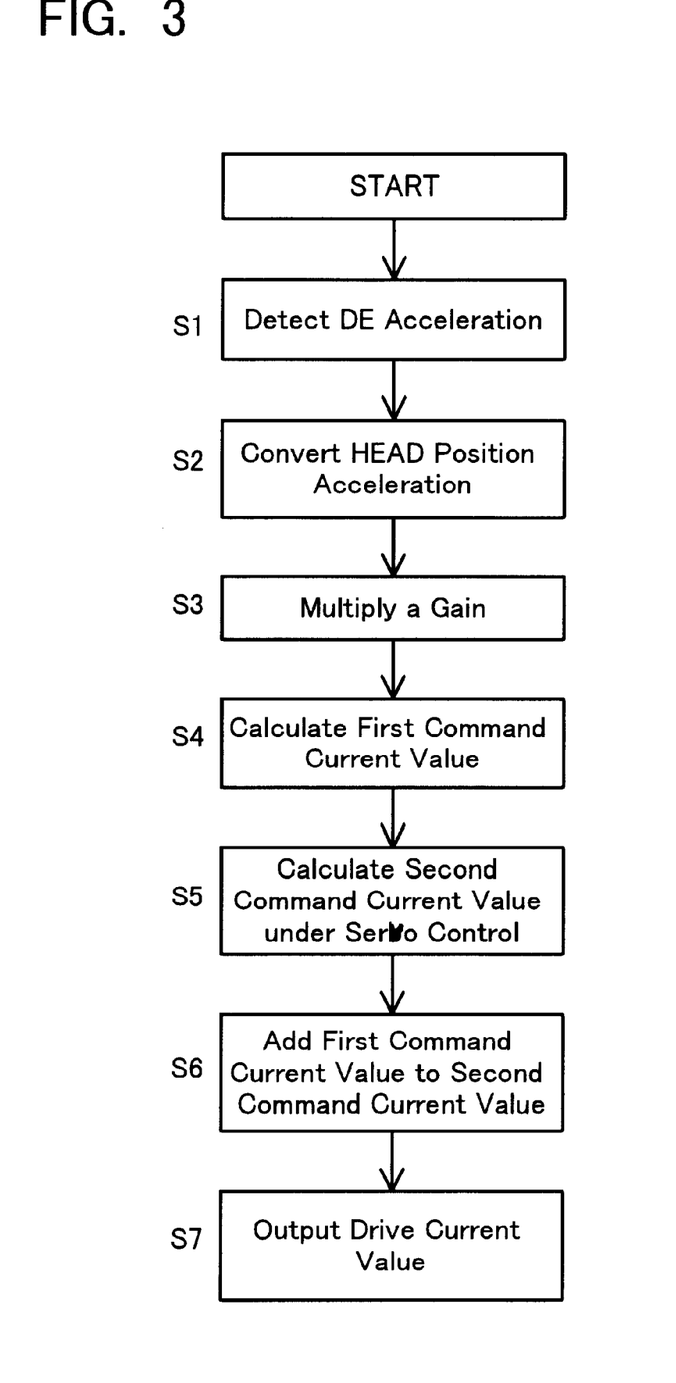
FIG. 3 is a flowchart showing a seek process in one embodiment of the present invention.

FIG. 1 is a diagram illustrating a construction of a magnetic disk device in one embodiment of the present invention. FIG. 2 is a diagram showing a vibration model of an enclosure in FIG. 1. FIG. 3 is a flowchart showing a seek process in one embodiment of the present invention.

As shown in FIG. 1, a magnetic disk device includes a magnetic disk 1 and a magnetic head 2. The magnetic disk 1 is rotated by a spindle motor 3. The magnetic head 2 reads and writes data from and to the magnetic disk 1. A voice coil motor 4 including an actuator locates the magnetic head 2 in a desired position on the magnetic disk 1.

An enclosure 5 accommodates the magnetic disk 1, the magnetic head 2, the spindle motor 3 and the voice coil motor 4. A control printed board 6 is attached to the enclosure 5. The control printed board 6 is mounted with an acceleration sensor 7 for detecting an acceleration of the enclosure 5, and with a control circuit 8. The control circuit 8 is constructed of a processor.

The enclosure 5 is fixed to a frame by a fixing method of normally fixing the enclosure 5. FIG. 2 shows a vibration model of the enclosure. As shown in FIG. 2, a drive value of a voice coil motor (VCM)4 is multiplexed by a constant Bl in a block 42. Then, the drive value is decreased by a factor "m" in a block 40, where "m" is the inertia of the actuator 4. Then, the value is reduced by a factor "$s^2$" and turns out to be a position, where "s" is the Laplace transformer.

An output of the block 42 is added to a disturbance as a vibration value in a block 43. This added value enters a model block of the enclosure. To start with, the added value is reduced by a factor of "M", where "M" is the inertia of the enclosure. Next, this value is multiplied by a mechanical transfer function G(s) in a block 51. The mechanical transfer function G(s) is based on the enclosure and the enclosure fixing method. This mechanical transfer function, with both the fixing method and the enclosure being already known, can be therefore obtained by a calculation at a design stage.

An output of this block 51 is detected as an acceleration of the enclosure by the acceleration sensor 7. Then, the acceleration is reduced by a factor "s" and turns out to be a position, where "s" is the Laplace transformer. A position of the block 52 corresponds to a vibration of the enclosure 5. A position of the magnetic head 2 is obtained by subtracting the vibration of the enclosure 5 from the position of the actuator 4 in a block 44.

As shown in this model diagram, when the mechanical transfer function G(s) is already known, an output of the acceleration sensor 7 can be calculated from a VCM drive value. For obtaining the known mechanical transfer function, the enclosure 5 is fixed to the frame by the predetermined fixing method, and the control printed board 6 is fitted to thereto.

Next, a seek process using the acceleration sensor will be explained referring to FIG. 3.

(S1) The control circuit 8 detects an output (an enclosure acceleration) of the acceleration sensor 7.

(S2) The control circuit 8 convert the detected acceleration into an acceleration in a head position.

(S3) The control circuit 8 multiplies the head position acceleration by a gain (a sensitivity of the acceleration sensor).

(S4) The control circuit 8 converts the acceleration multiplied by the gain into a first current command value of the VCM 4.

(S5) The control circuit 8 calculates a second current command value (VCM drive value) under the known servo positioning control.

(S6) The control circuit 8 adds the first current command value of the acceleration sensor to this second current command value.

(S7) The control circuit 8 outputs to the VCM 4 this added value as a current command value of the VCM 4.

Thus, the acceleration sensor 7 detects the acceleration of the enclosure 5, and the control circuit 8 creates such a current command value as to compensate the acceleration of the enclosure by the detected acceleration. This created value is added to the servo current command value, thereby driving the VCM 4. Therefore, the head 2 can be positioned so as to compensate the vibration of the enclosure.

Figure 4:
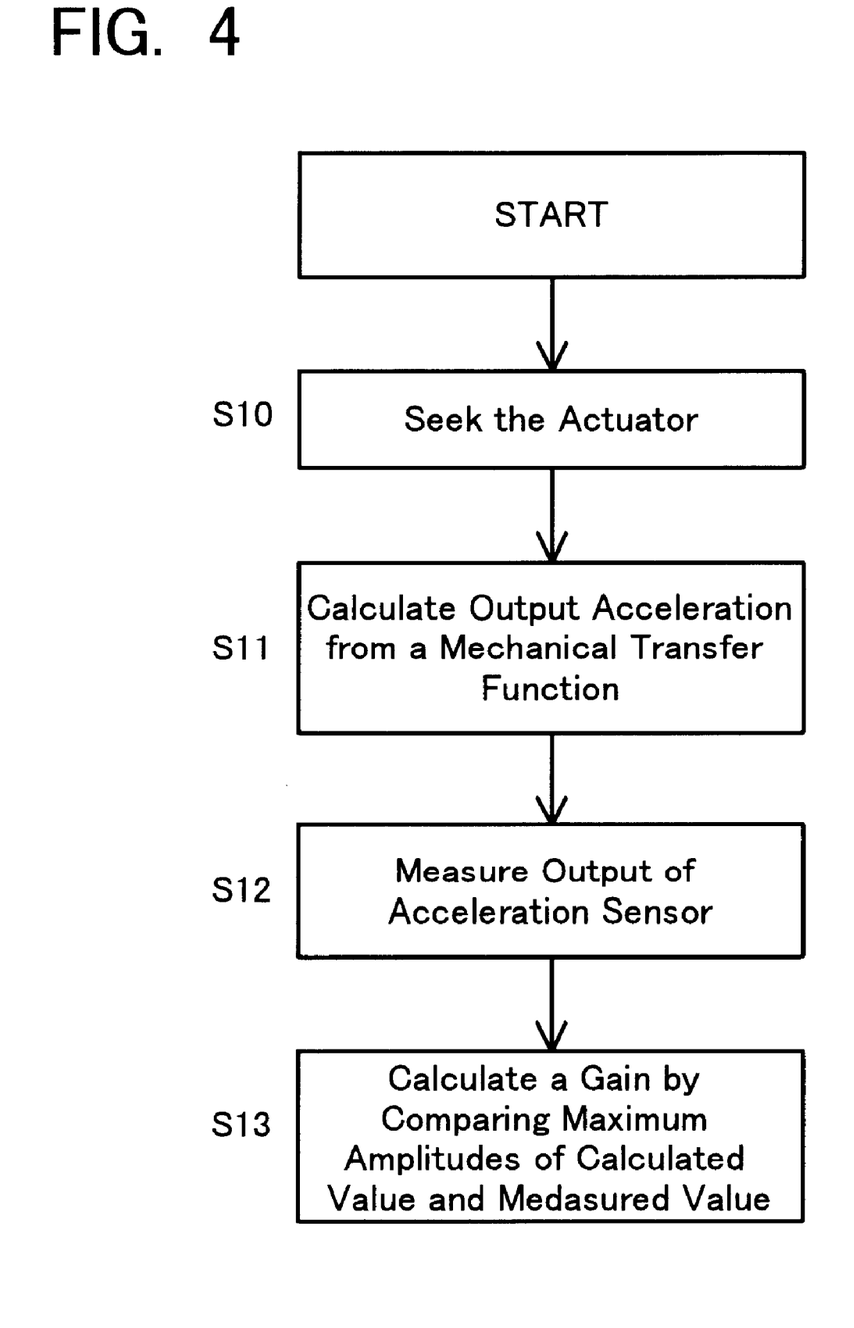
FIG. 4 is a flowchart showing a calibration process in one embodiment of the present invention.
Figure 5:
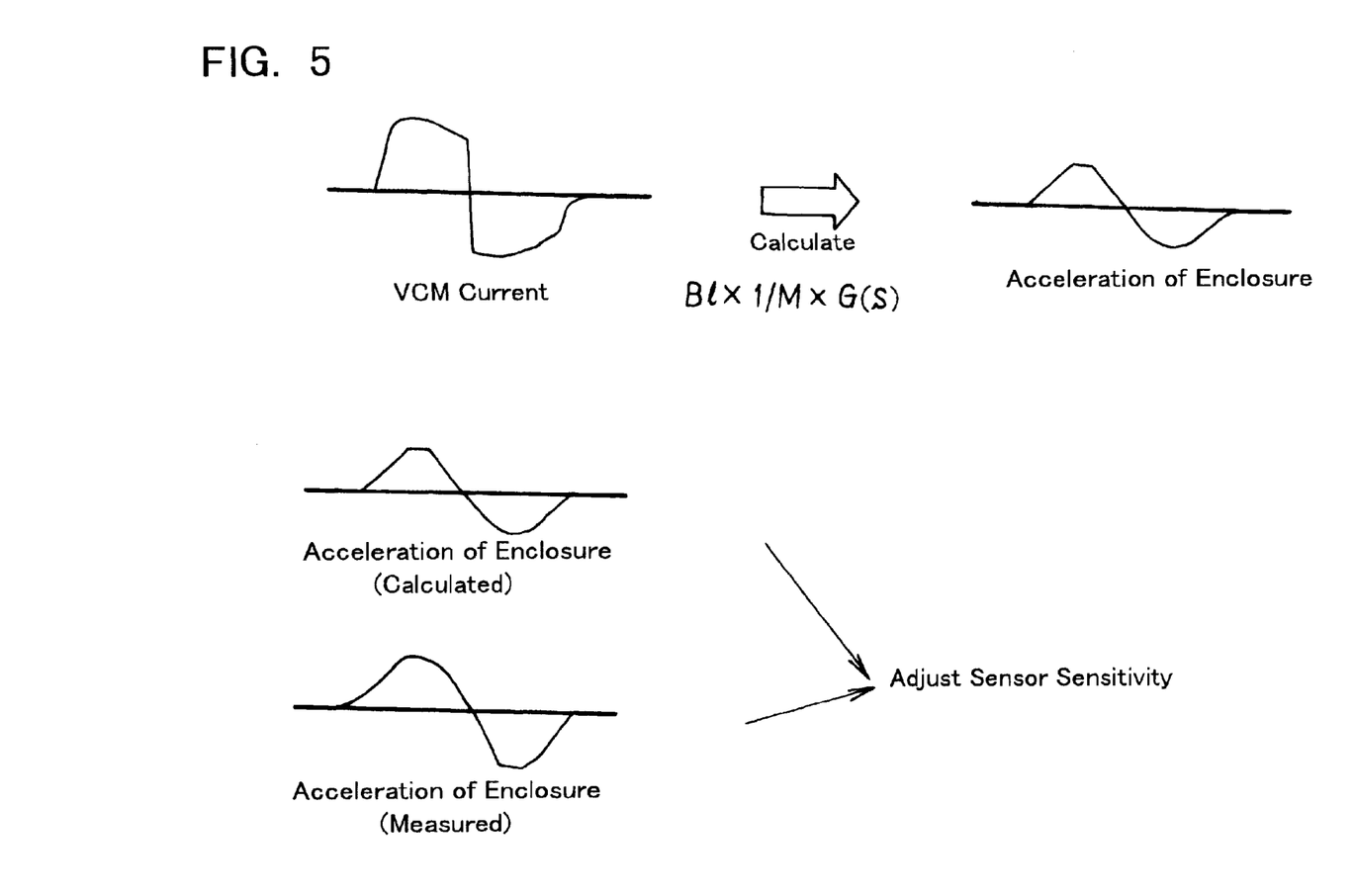
FIG. 5 is an explanatory diagram showing the calibration process in FIG. 4.

FIG. 4 is a calibration processing flowchart in one embodiment of the present invention. FIG. 5 is an explanatory diagram showing the calibrating process.

(S10) The control circuit 8 seeks the actuator 4 at a predetermined distance. The VCM current, as illustrated in FIG. 5, exhibits an acceleration curve and a deceleration curve.

(S11) The control circuit 8 calculates an enclosure acceleration CC by use of the VCM current value V and the mechanical transfer function G(s) in the following formula (1):

$$CC = V \cdot Bl \cdot 1/M \cdot G(s) \qquad (1)$$

(S12) Next, the control circuit 8 measures an output MC of the acceleration sensor 7.

(S13) The control circuit 8 compares a maximum amplitude value of the calculated enclosure acceleration CC with a maximum amplitude value of the measured acceleration MC, thereby determining a calibration gain (a sensitivity). The calibration gain [G] is obtained by the following formula (2):

$$G = A/D$$

Where [A] is the maximum amplitude value of the calculated enclosure acceleration CC, and [D] is the maximum amplitude value of the measured acceleration MC. Note that in this measurement a seek command value is obtained in the seek process in FIG. 3, with the calibration gain being set to an initial value "0".

Thus, the sensitivity (the calibration gain) of the sensor is adjusted to the calculated value and stored as a gain in a RAM of the control circuit 8.

Figure 6:
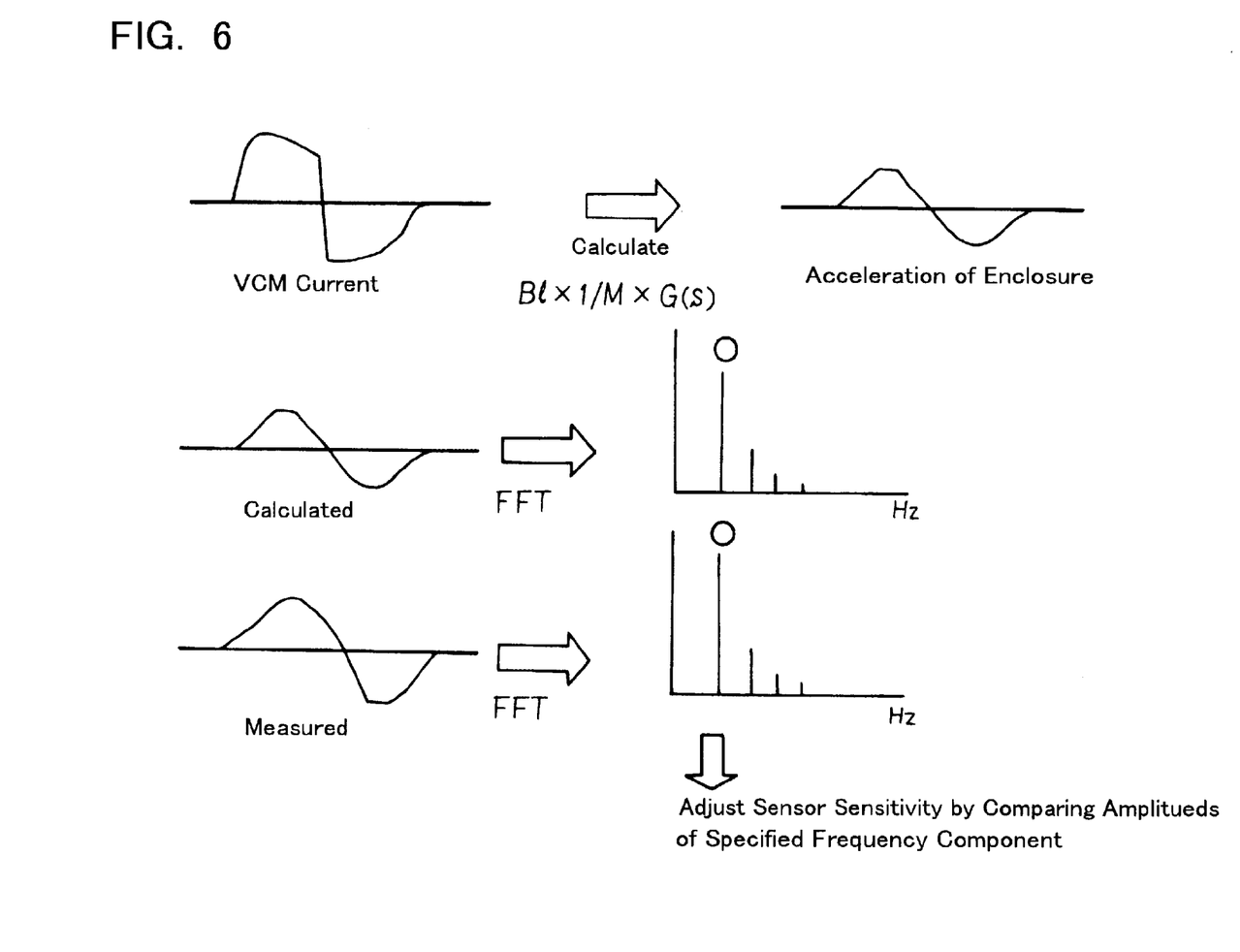
FIG. 6 is an explanatory diagram showing another calibration process in FIG. 5.

FIG. 6 is an explanatory diagram showing another calibration process according to the present invention.

In accordance with this embodiment, in step S11 in FIG. 4, the calculated enclosure acceleration CC undergoes a fast Fourier transform (FFT) into frequency components. Then, in step S12, the measured acceleration MC is subjected to the fast Fourier transform (FFT) into frequency components. Further, amplitudes of specified frequency components of both frequency components are compared with each other, thereby obtaining a sensitivity of the sensor.

With this operation being thus done, a resonance frequency component of the enclosure 5 is eliminated, and the amplitudes can be compared. The sensitivity of the acceleration sensor can be therefore determined without being influenced by the resonance of the enclosure.

The above-described calibration of the sensitivity is performed several times, and it is desirable that an average value thereof be determined as a sensitivity (gain). For example, the seek for the measurement is carried out in a forward direction and in a reverse direction, then the sensitivities in these directions are calculated, and an average value thereof may be adopted. Further, the seek for the measurement is conducted in combination with the seek operations at a plurality of distances, then the sensitivities in these respective cases are calculated, and an average value thereof may also be adopted.

In this instance, it is required that an interval of the plurality of seeks be taken long enough to be narrower than a measurement frequency range. Moreover, the seek distance may involve the use of a random value. In addition, it is desirable that the seek distance be adjusted so that a frequency of the electric current of the actuator becomes approximate to a frequency to be measured.

Figure 7:
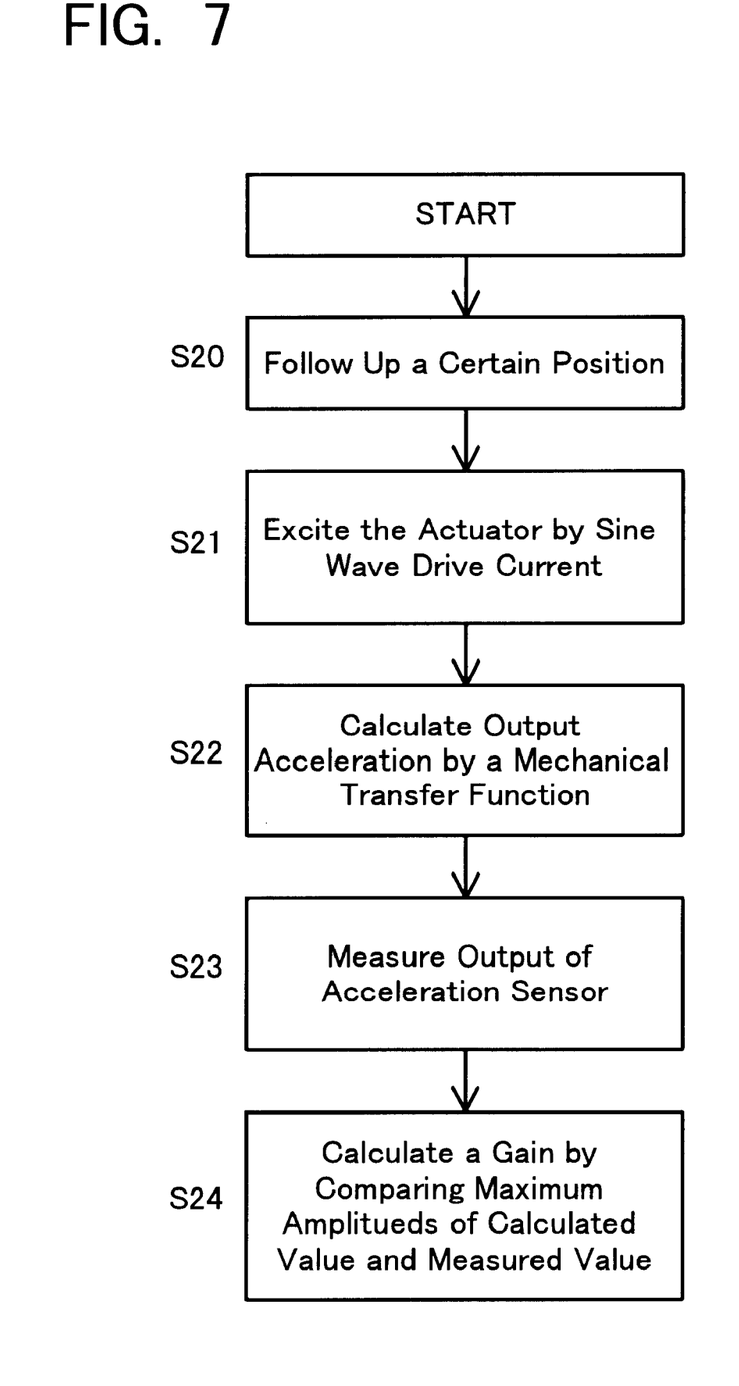
FIG. 7 is a flowchart showing still another calibration process according to the present invention.
Figure 8:
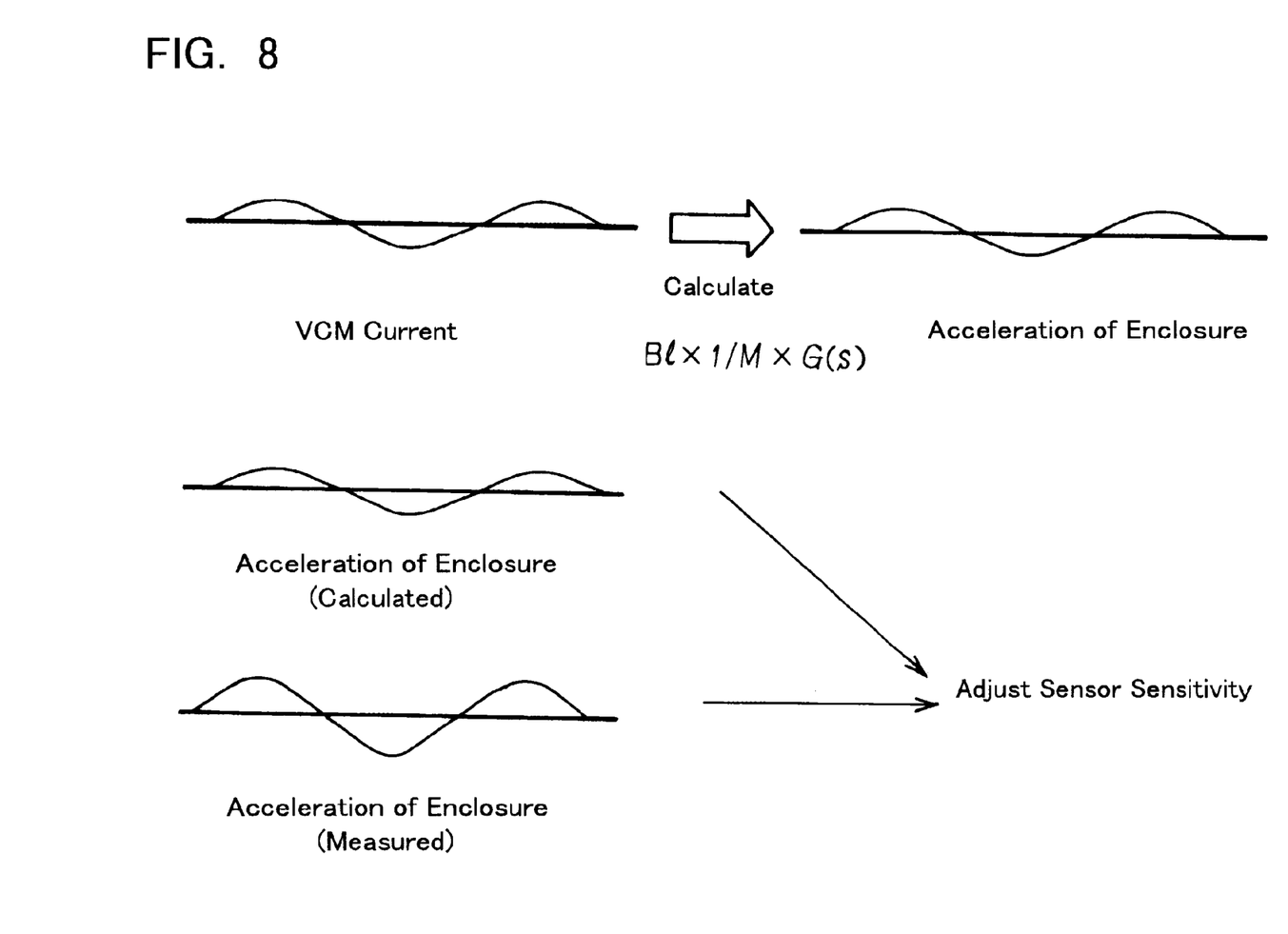
FIG. 8 is an explanatory diagram showing a further calibration process in FIG. 7.

FIG. 7 is a flowchart showing another calibration process according to the present invention. FIG. 8 is an explanatory diagram showing this calibration process.

(S20) The control circuit 8 makes the actuator 4 follow up a specified position.

(S21) The control circuit 8, as shown in FIG. 8, applies a sine wave current command value to the VCM 4, and excites the actuator.

(S22) The control circuit 8 calculates the enclosure acceleration CC in the formula (1) by use of the VCM current value V and the mechanical transfer function G(s).

(S23) Next, the control circuit 8 measures the output MC of the acceleration sensor 7.

(S24) The control circuit 8 compares the maximum amplitude value of the calculated enclosure acceleration CC with the maximum amplitude value of the measured acceleration MC, thus determining the calibration gain (the sensitivity). For example, let [G] be the calibration gain, [A] be the maximum amplitude value of the enclosure acceleration CC, and ⌈D⌋ be the maximum amplitude value of the measured acceleration MC, and the calibration gain G is obtained by the formula (2) described above.

Note that in this measurement the calibration gain is set to the initial value "0" when in the follow-up process. Thus, the sensitivity (the calibration gain) of the sensor is adjusted to the calculated value and stored as a gain in the RAM of the control circuit 8.

According to this method, the actuator is excited by changing the sine wave frequency, then the respective sensitivities in each frequency are calculated, and an average value is adopted as a gain. Similarly, the actuator is excited by changing a sine wave amplitude, then the respective sensitivities in each amplitude are calculated, and an average value is adopted as a gain. Further, the actuator is excited by changing an actuator following position, then the respective sensitivities in each position are calculated, and an average value is adopted as a gain.

Figure 9:
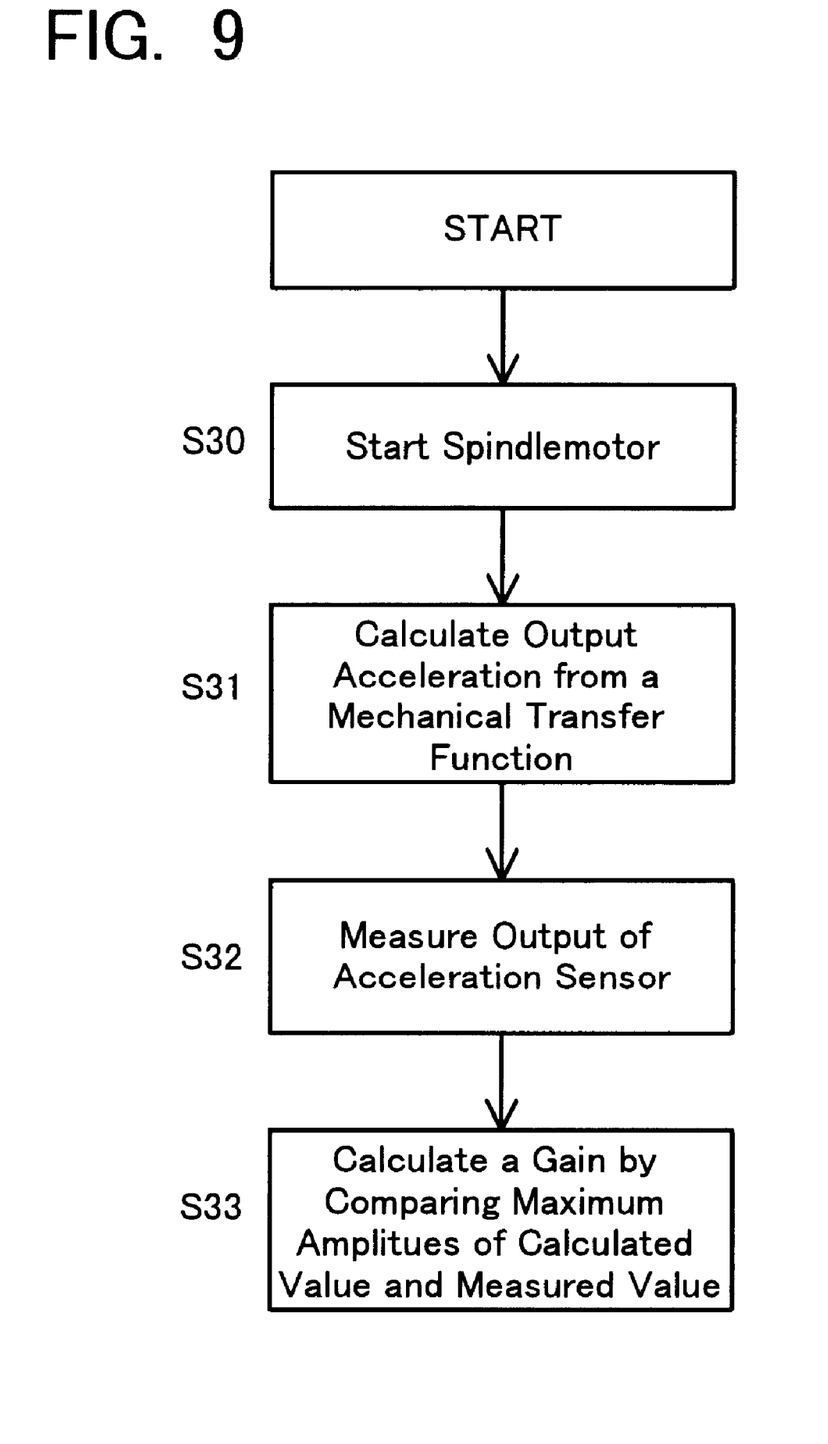
FIG. 9 is a flowchart showing a still further calibration process according to the present invention.

FIG. 9 is a flowchart showing still another calibration process according to the present invention.

(S30) The control circuit 8 starts up the spindle motor 3.

(S31) The control circuit 8 calculates the enclosure acceleration CC by use of a start-up current value V of the spindle motor and the mechanical transfer function G(s).

(S32) Next, the control circuit 8 measures the output MC of the acceleration sensor 7.

(S33) The control circuit 8 compares the maximum amplitude value of the calculated enclosure acceleration CC with the maximum amplitude value of the measured acceleration MC, thus determining the calibration gain (the sensitivity). For example, let ⌈G⌋ be the calibration gain, ⌈A⌋ be the maximum amplitude value of the enclosure acceleration CC, and ⌈D⌋ be the maximum amplitude value of the measured acceleration MC, and the calibration gain ⌈G⌋ is obtained by the formula (2) described above.

Note that in this measurement the calibration gain is set to the initial value "0" when starting up the spindle motor. Thus, the sensitivity (the calibration gain) of the sensor is adjusted to the calculated value and stored as a gain in the RAM of the control circuit 8.

According to this method, the enclosure is excited by starting up the spindle motor, and the sensitivity of the acceleration sensor 7 is measured.

The measurement thereof may be made when adjusted in the factory by fitting the control printed board to the enclosure fixed to the frame. In this case, the control circuit of the control printed board incorporates a program for executing the calibration process. Alternatively, the calibration processing program may also be downloaded into the control circuit 8 from a tester when in the adjusting operation.

Further, in a field, the control circuit may executes the calibration process as a part of the calibration.

Moreover, the acceleration sensor usable herein is classified as an electrostatic capacity type and a mechanical type etc in addition to the piezoelectric type. Further, a plurality of acceleration sensors may also be used for the magnetic disk device.

In addition to the embodiment discussed above, the present invention may be modified as follows:

(1) The magnetic disk device has been exemplified as a storage disk device, however, the present invention can be applied to other storage devices such as a magneto-optic disk device and an optical disk device etc.

(2) The acceleration sensor may be provided directly on the enclosure.

The present invention has been discussed so far by way of the embodiment but may be modified in many ways within the range of the gist of the present invention, and those modifications are not excluded from the scope of the present invention.

As discussed above, the present invention exhibits the following effects.

(1) The sensitivity of the acceleration sensor can be calibrated in the state of its being actually mounted on the device, and can be therefore adjusted to a precise value.

(2) Furthermore, the process therefor is the calculation process and is therefore easy to perform.

What is claimed is:

1. A calibration method for an acceleration sensor in a storage device comprising:
   a head for reading data from a storage medium;
   an actuator for positioning said head with respect to said storage medium;
   an enclosure for accommodating said storage medium, said head and said actuator;
   an acceleration sensor for detecting an acceleration of said enclosure; and
   a control circuit for calculating a first command value from an output of said acceleration sensor and a sensitivity of said acceleration sensor, and then, calculating a drive current value of said actuator from said first command value and a second command value for servo control,
   said calibration method comprising:
   a step of exciting said actuator by flowing a drive current having a predetermined value to said actuator;
   a step of calculating the acceleration of said enclosure from the predetermined current value and a mechanical transfer function of said storage device;
   a step of detecting a measured value of said acceleration sensor; and
   a step of calculating the sensitivity of said acceleration sensor from the calculated acceleration and from the detected measured value.

2. A calibration method for an acceleration sensor in a storage device according to claim 1,
   wherein said exciting step comprises a step of flowing a seek current for accelerating and decelerating said actuator.

3. A calibration method for an acceleration sensor in a storage device according to claim 2,
   wherein said exciting step includes:
   a step of flowing a drive current for seeking said actuator in a forward direction; and
   a step of flowing the drive current for seeking said actuator in a reverse direction.

4. A calibration method for an acceleration sensor in a storage device according to claim 2,
   wherein said exciting step includes:
   a step of flowing a drive current for seeking said actuator at a first distance; and
   a step of flowing a drive current for seeking said actuator at a second distance different from the first distance.

5. A calibration method for an acceleration sensor in a storage device according to claim 2,
   wherein said calculating step comprises:
   a step of Fourier-transforming the acceleration obtained by the calculation;
   a step of Fourier-transforming the measured acceleration; and
   a step of calculating the sensitivity of said acceleration sensor by comparing specified frequency components of the two Fourier-transformed accelerations.

6. A calibration method for an acceleration sensor in a storage device according to claim 1,
   wherein said exciting step comprises a step of flowing a drive current to said actuator so that said actuator follows up a specified position.

7. A calibration method for an acceleration sensor in a storage device according to claim 6, wherein said exciting step includes:

a step of flowing a drive current having a first measurement frequency to said actuator; and a step of flowing to said actuator a drive current having a second measurement frequency different from the first measurement frequency.

8. A calibration method for an acceleration sensor in a storage device according to claim 6, wherein said exciting step includes:

a step of flowing to said actuator a drive current having a first amplitude value; and a step of flowing to said actuator a drive current having a second amplitude value different from the first amplitude value.

9. A calibration method for an acceleration sensor in a storage device comprising:

a head for reading data from a storage disk;

an actuator for positioning said head with respect to said storage disk;

a spindle motor for rotating said storage disk; and an enclosure for accommodating said storage disk, said head, said spindle motor and said actuator;

an acceleration sensor for detecting an acceleration of said enclosure;

a control circuit for calculating a first command value from an output of said acceleration sensor and a sensitivity of said acceleration sensor, and then calculating a drive current value of said actuator from said first command value and a second command value for servo control, said calibration method comprising:

a step of starting up said spindle motor;

a step of calculating the acceleration of said enclosure from the start-up current value and from a mechanical transfer function of said storage device;

a step of detecting a measured value of said acceleration sensor; and a step of calculating the sensitivity of said acceleration sensor from the calculated acceleration and from the detected measured value.

10. A storage device comprising:

a head for reading data from a storage medium;

an actuator for positioning said head with respect to said storage medium;

an enclosure for accommodating said storage medium, said head and said actuator;

an acceleration sensor for detecting an acceleration of said enclosure; and a control circuit having a seek process mode for calculating a first command value from an output of said acceleration sensor and a sensitivity of said acceleration sensor and then calculating a drive current value of said actuator from said first command value and a second command value for servo control, and a calibration process mode for calculating the sensitivity of said acceleration sensor from the output of said acceleration sensor when exciting said actuator and a drive current value of said actuator when exciting said actuator.

11. A storage device according to claim 10, wherein said control circuit having the calibration process mode for exciting said actuator by flowing a drive current having a predetermined value to said actuator, calculating the acceleration of said enclosure from the predetermined current value and a mechanical transfer function of said storage device, detecting a measured value of said acceleration sensor, and calculating the sensitivity of said acceleration sensor from the calculated acceleration and the detected measured value.

12. A storage device according to claim 11, wherein said control circuit having the calibration process mode for flowing a seek current for accelerating and decelerating said actuator for exciting said actuator.

13. A storage device according to claim 12, wherein said control circuit having the calibration process mode for flowing a drive current for seeking said actuator in a forward direction and flowing a drive current for seeking said actuator in a reverse direction.

14. A storage device according to claim 12, wherein said control circuit having the calibration process mode for flowing a drive current for seeking said actuator at a first distance and flowing a drive current for seeking said actuator at a second distance.

15. A storage device according to claim 12, wherein said control circuit having the calibration process mode for calculating the sensitivity of said acceleration sensor from a specified frequency component of Fourier-transformed components of said calculated acceleration and a specified frequency component of Fourier-transformed components of said measured acceleration.

16. A storage device according to claim 11, wherein said control circuit having the calibration process mode for flowing a drive current to said actuator so that said actuator follows up a specified position.

17. A storage device according to claim 16, wherein said control circuit having the calibration process mode for flowing a first drive current having a first frequency and flowing a second drive current having a second frequency.

18. A storage device according to claim 16, wherein said control circuit having the calibration process mode for flowing a first drive current having a first amplitude and flowing a second drive current having a second amplitude.

19. A storage device comprising:

a head for reading data from a storage disk;

an actuator for positioning said head with respect to said storage disk;

a spindle motor for rotating said storage disk;

an enclosure for accommodating said storage disk, said head, said actuator and said spindle motor;

an acceleration sensor for detecting an acceleration of said enclosure; and a control circuit having a seek process mode for calculating a first command value from an output of said acceleration sensor and a sensitivity of said acceleration sensor and then calculating a drive current value of said actuator from said first command value and a second command value for servo control, and a calibration process mode for calculating the sensitivity of said acceleration sensor from the output of said acceleration sensor when starting up said spindle motor and a start-up current value of said spindle motor.

* * * * *